United States Patent
Khowaylo et al.

(10) Patent No.: US 8,371,471 B2
(45) Date of Patent: Feb. 12, 2013

(54) THERMALLY BROKEN BEVERAGE CONTAINER AND METHOD OF FABRICATION

(76) Inventors: Alex I. Khowaylo, Englewood, NJ (US); Donald Van Biert, Upper Saddle River, NJ (US)

(*) Notice: Subject to any disclaimer, the term of this patent is extended or adjusted under 35 U.S.C. 154(b) by 618 days.

(21) Appl. No.: 12/395,393

(22) Filed: Feb. 27, 2009

(65) Prior Publication Data

US 2010/0218581 A1  Sep. 2, 2010

(51) Int. Cl.
*A47G 19/00* (2006.01)
(52) U.S. Cl. ......... 220/592.17; 220/592.16; 220/592.27; 220/906
(58) Field of Classification Search ............ 220/592.16, 220/592.17, 592.27, 592.26, 592.25, 906, 220/270, 272, 269
See application file for complete search history.

(56) References Cited

U.S. PATENT DOCUMENTS

| | | | |
|---|---|---|---|
| 2,526,165 A | 10/1950 | Smith | |
| 4,151,923 A | 5/1979 | Bernardi | |
| 4,255,457 A | 3/1981 | Collias | |
| 4,261,501 A | 4/1981 | Watkins et al. | |
| RE32,127 E * | 4/1986 | Abner | 229/5.6 |
| 4,595,437 A | 6/1986 | Yamamoto | |
| 4,974,741 A | 12/1990 | Gustafson et al. | |
| 4,993,580 A | 2/1991 | Smith | |
| 5,326,019 A | 7/1994 | Wolff | |
| 5,431,297 A | 7/1995 | Rosello | |
| 5,515,995 A | 5/1996 | Allen et al. | |
| 5,542,599 A | 8/1996 | Sobol | |
| 5,579,946 A | 12/1996 | Rowan et al. | |
| RE35,830 E | 6/1998 | Sadlier | |
| 6,119,889 A | 9/2000 | Fujii et al. | |
| 6,253,995 B1 | 7/2001 | Blok et al. | |
| 6,371,328 B1 * | 4/2002 | Yamada et al. | 220/592.2 |
| 6,499,311 B2 | 12/2002 | Mahajan | |
| D557,561 S | 12/2007 | Flowers et al. | |
| 2003/0146224 A1* | 8/2003 | Fujii et al. | 220/592.27 |
| 2003/0230586 A1* | 12/2003 | Murakami | 220/592.17 |
| 2006/0131317 A1 | 6/2006 | Bresler | |
| 2006/0186125 A1 | 8/2006 | Tew | |
| 2007/0108208 A1* | 5/2007 | Dickie | 220/269 |
| 2008/0041860 A1* | 2/2008 | Wiedmeyer et al. | 220/592.26 |
| 2008/0169297 A1 | 7/2008 | Kelly | |

FOREIGN PATENT DOCUMENTS

JP  10117913  5/1998

OTHER PUBLICATIONS

International Search Report of the International Searching Authority mailed Apr. 16, 2010, issued in connection with International Patent Appln. No. PCT/US2010/024011 (3 pages).
Written Opinion of the International Searching Authority mailed Apr. 16, 2010, issued in connection with International Patent Appln. No. PCT/US2010/024011 (4 pages).

* cited by examiner

*Primary Examiner* — Stephen Castellano
(74) *Attorney, Agent, or Firm* — McCarter & English, LLP

(57) ABSTRACT

A beverage container having a double-walled construction is provided. The container includes an inner wall with an inner bottom wall for containing a beverage, an outer wall which extends about the inner wall, and an outer bottom wall which extends under the inner bottom wall. A thermal break extends uninterrupted between the outer surface of the inner wall and the inner surface of the outer wall and the inner bottom and outer bottom walls. The container includes a top having an upper rim which joins the periphery of the top, the inner wall, and the outer wall.

14 Claims, 13 Drawing Sheets

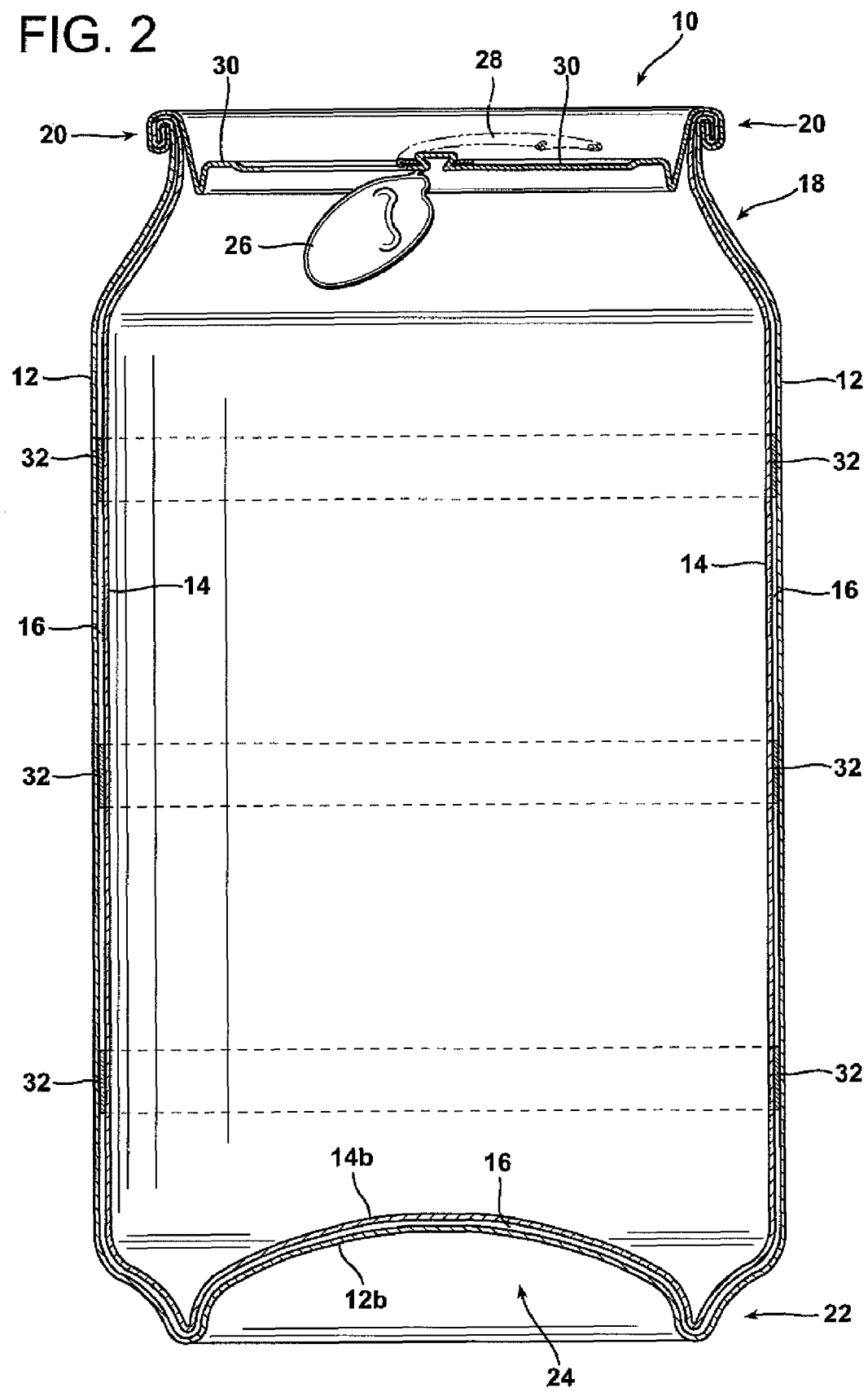

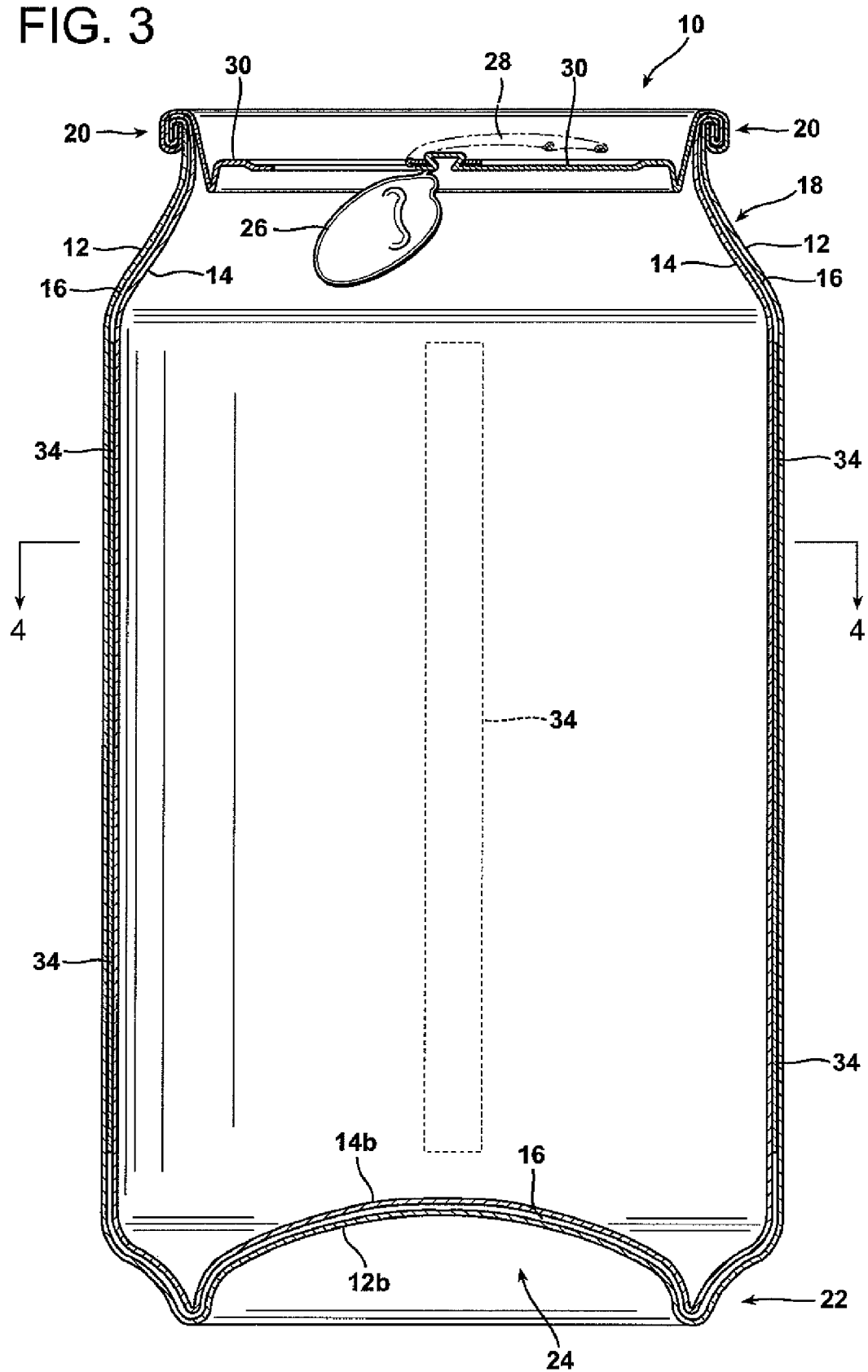

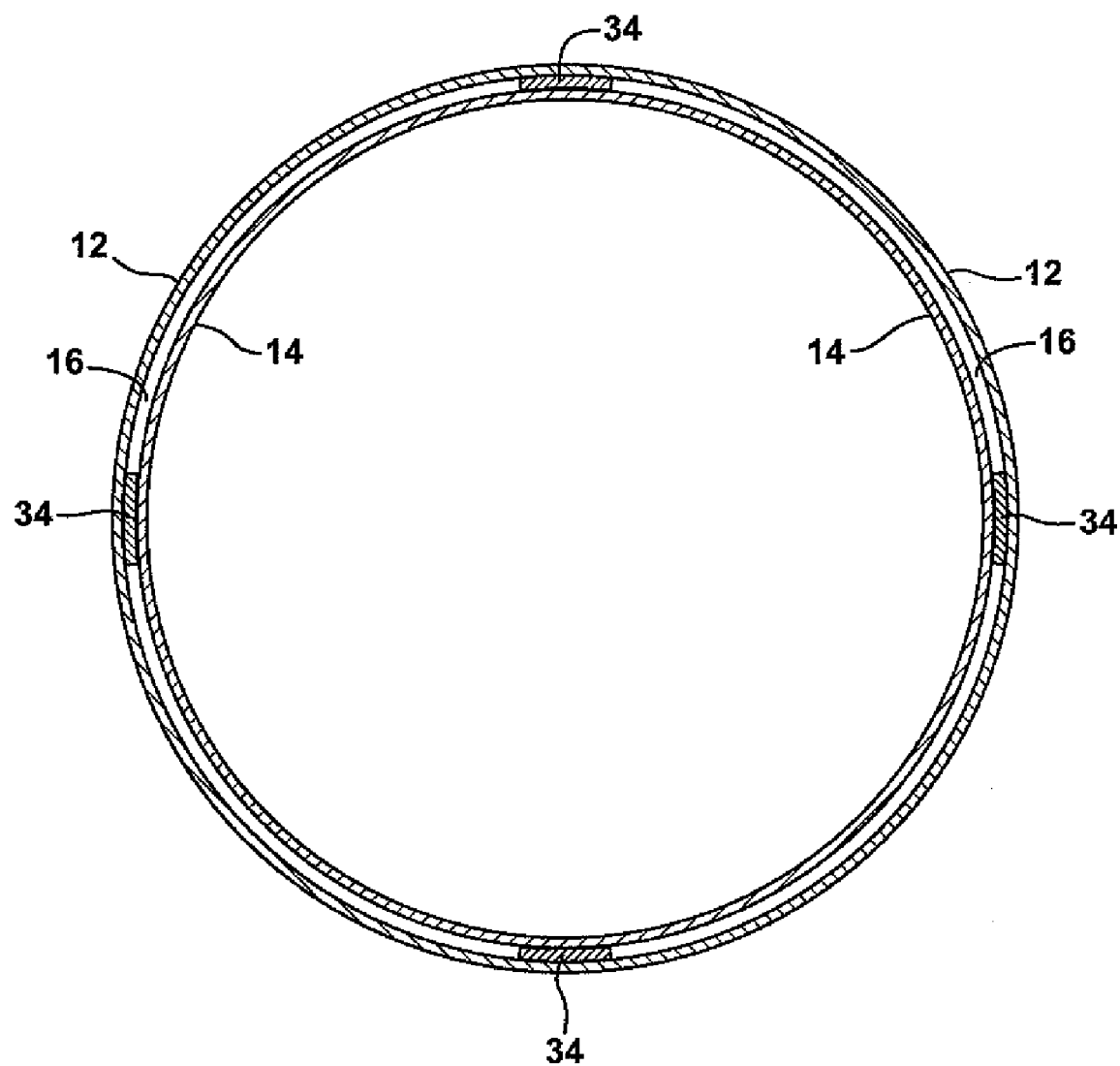

THERMALLY BROKEN BEVERAGE CONTAINER AND METHOD OF FABRICATION

BACKGROUND OF THE INVENTION

1. Field of the Invention

The present invention relates to beverage containers. More specifically, the present invention relates to a double-walled beverage container having inner and outer walls joined at an upper rim and having a thermal break formed between the walls.

2. Related Art

Beverage containers exist in various shapes and sizes. One common type of beverage container is an aluminum can having a partially-removable tab and a finger lever for opening the tab. Once opened, a beverage can be consumed or poured through the opened tab. Various types of beverages, such as sodas, beer, etc., are contained in cans of this type.

Unfortunately, common aluminum beverage cans do not adequately insulate the contents of the can from heat outside of the can, due to the fact that the can is formed with a single wall which is thermally conductive. As a result, heat from the environment can heat the contents, and even more so, as one holds a cold beverage can, heat is transferred from one's hand to the contents of the can, adding sufficient heat to raise the temperature of the contents of the can to an undesirable level. One solution to this problem in the past is an insulating sleeve that fits over the can. Such sleeves are often made from foam or other similar insulating material. However such sleeves only partially fit over beverage containers, have poor insulating properties and are cumbersome to use. Other solutions relate to double-walled containers, however, these solutions do not provide a thermal break which extends, uninterrupted, along the entire side and bottom of the container.

SUMMARY OF THE INVENTION

The present invention relates to a beverage container having a double-walled construction with a thermal break. The container includes an inner wall with an inner bottom wall for containing a beverage, an outer wall which extends about the inner wall, and an outer bottom wall which extends under the inner bottom wall. A thermal break extends, uninterrupted, between the inner wall and the outer wall and the inner bottom and outer bottom walls. The container includes a top having an upper rim which joins the periphery of the top, the inner wall, and the outer wall. The upper rim could be formed using a crimping process, wherein the peripheral edges of the top, the inner wall, and the outer wall are crimped together.

The outer wall and the thermal break are co-extensive in height with the inner wall, so as to completely surround the inner wall, and the thermal break extends, uninterrupted, between the inner and outer walls and between the inner and outer bottom walls. The thermal break inhibits heat from the environment from being transmitted into the contents of the can, and even more so, heat from a person's hand when holding the container, to keep a beverage within the container cool. The thermal break could comprise air and/or a material which occupies all or part of the space between inner and outer walls (e.g., in the form of vertical strips of material, or annular rings of material), or the thermal break could be entirely comprised of a thermally non-conductive material.

BRIEF DESCRIPTION OF THE DRAWINGS

The foregoing features of the invention will be apparent from the following Detailed Description of the Invention, taken in connection with the accompanying drawings, in which:

FIG. 2 is a cross-sectional view of the beverage container of the present invention, taken along line 2-2 of FIG. 1B;

FIGS. 3-5 are cross-sectional views of the beverage container of the present invention, showing various configurations of the thermal break;

DETAILED DESCRIPTION OF THE INVENTION

The present invention relates to a beverage container, described in detail below in connection with FIGS. 1A-10.

Figure 1A:
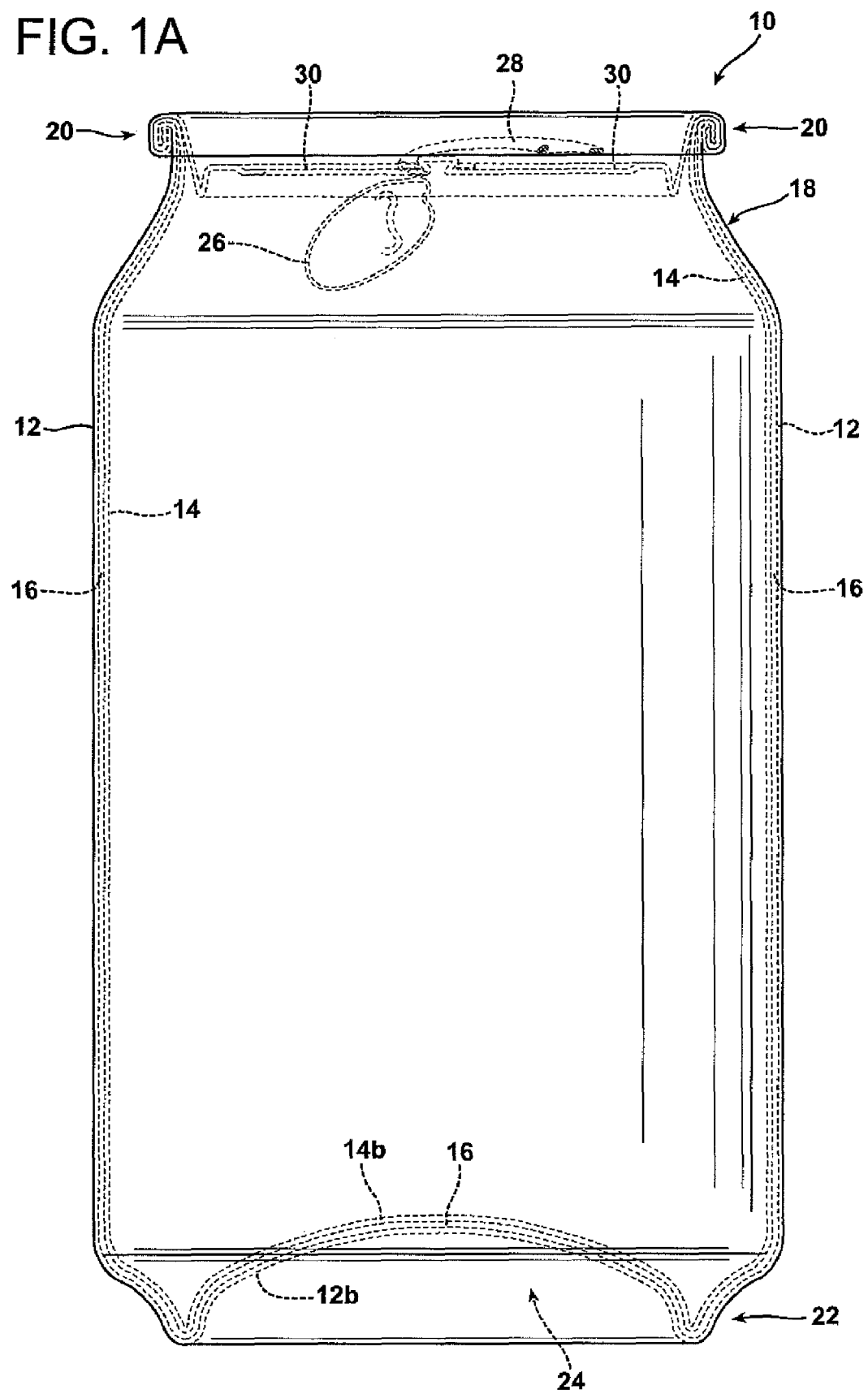
FIGS. 1A-1B are side and top views, respectively, showing the beverage container of the present invention.
Figure 1B:
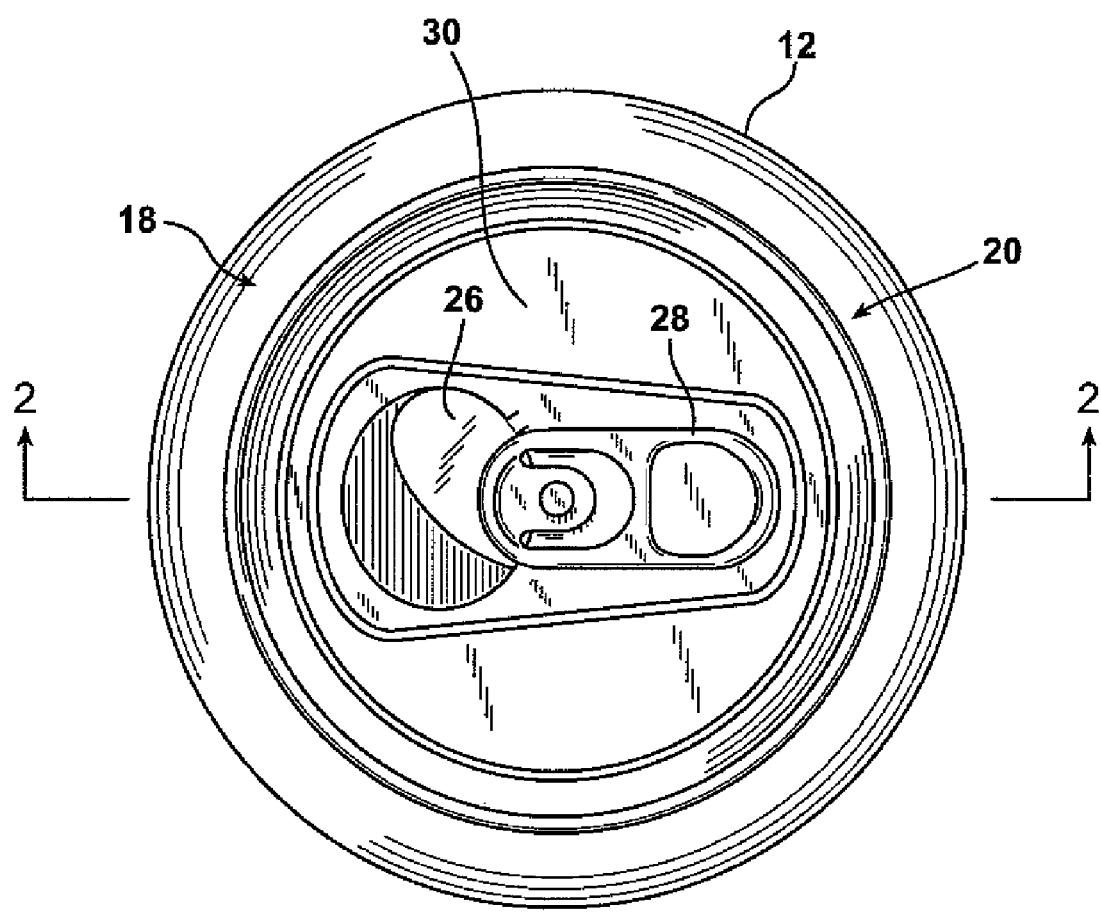

FIGS. 1A-1B are side and top views, respectively, of the beverage container 10 of the present invention. The container 10 includes an outer wall 12 having an outer bottom wall 12b, and an inner wall 14 having an inner bottom wall 14b positioned within the outer wall 12 and the outer bottom wall 12b for containing a liquid (e.g., a beverage). A thermal break 16 extends uninterrupted between the inner surface of the outer wall 12 and the outer surface of the inner wall 14, and between the inner surface of the outer bottom wall 12b and the outer surface of the inner bottom wall 14b. The inner surface of the outer wall 12 and the thermal break 16 are co-extensive in height with the outer surface of the inner wall 14, so as to completely surround the outer surface of the inner wall 14 to provide a thermal break along the entire height of the container. The thermal break 16 inhibits thermal energy outside of the outer wall 12 and the outer bottom wall 12b (e.g., heat in the ambient air, or heat from a person's hand when the container 10 is held) from being transmitted into a liquid contained within the inner wall 14 and the inner bottom wall 14b, to assist in keeping a beverage cool. The thermal break 16 could comprise air and/or a material which occupies all or part of the space between inner and outer walls 12, 14 and inner and outer bottom walls 12b, 14b (e.g., in the form of vertical strips of material, or annular rings of material, discussed below), or the thermal break could be entirely comprised of thermally non-conductive material.

As shown in FIGS. 1A-1B, the container 10 is in the shape of a conventional beverage container (e.g., the shape of a beverage can). Of course, this shape could be varied as desired. The container 10 includes a tapered upper region 18, an upper rim 20, a tapered lower region 22, and a recessed bottom region 24. A tab 26 and an associated finger lever 28 could be provided, as in conventional beverage cans. The finger lever 28 can be raised by a person's finger to apply force to the tab 26 to partially separate the tab 26 from a top 30 of the can and to force the tab 26 below the top 30, so as to open the container 10 to provide access to a liquid contained within the inner wall 14 and the bottom inner wall 14b. Advantageously, the thermal break 16 extends along the entire height of the container 10, up to the upper rim 20, and along the entire width of the bottom of the container 10 (i.e., extending continuously between the outer bottom wall 12b and the inner bottom wall 14b) so as to maximize insulation of the outer wall 12 from the inner wall 14. Indeed, physical contact between the outer wall 12 and the inner wall 14 only occurs only at the upper rim 20, thereby minimizing conduction of thermal energy between the outer wall 12 and the inner wall 14. It is noted that the outer wall 12 and the outer bottom wall 12b, the inner wall 14 and the inner bottom wall 14b, and the top 30, as well as the tab 26 and the finger lever 28, could be formed from any suitable, lightweight material, such as aluminum (as is used to form conventional beverage cans).

FIG. 2 is a cross-sectional view of the container 10 of the present invention, taken along the line 2-2 of FIG. 1B. The thermal break 16 could include annular strips of material 32 positioned between the outer wall 12 and the inner wall 14. The strips 32 could be attached to the inner surface of the outer wall 12 and the outer surface of the inner wall 14 to provide a degree of structural rigidity for the container 10 and to resist compression of the outer wall 12 against the inner wall 14 (e.g., when force is applied by a person's hand while handling the container 10). Also, the strips 32 could be formed (e.g., by coating) on either the inner surface of the outer wall 12 or the outer surface of the inner wall 14 prior to assembly of the container 10, or prior to the formation of the walls. The strips 32 also function as a thermal break. The strips 32 could be formed of any suitable, lightweight material, such as plastic or foam.

FIGS. 3-4 are cross-sectional views of the container 10 of the present invention, wherein the thermal break 16 includes a plurality of vertical strips 34 are positioned between the inner surface of the outer wall 12 and the outer surface of the inner wall 14. Similar to the annular strips 32 shown in FIG. 2, the vertical strips 34 could be attached between the inner surface of the outer wall 12 and the outer surface of the inner wall 14 to provide a degree of structural rigidity for the container 10, and to resist compression of the outer wall 12 against the inner wall 14. Additionally, similar to the annular strips 32, the vertical strips 34 also function as a thermal break, and could be formed (e.g., by dipping, coating, spraying, etc.) on the inner surface of the outer wall 12 or the outer surface of the inner wall 14 prior to assembly of the container 10, or prior to the formation of the walls. The strips 34 could be formed from any suitable, lightweight material, such as plastic or foam.

Figure 5:
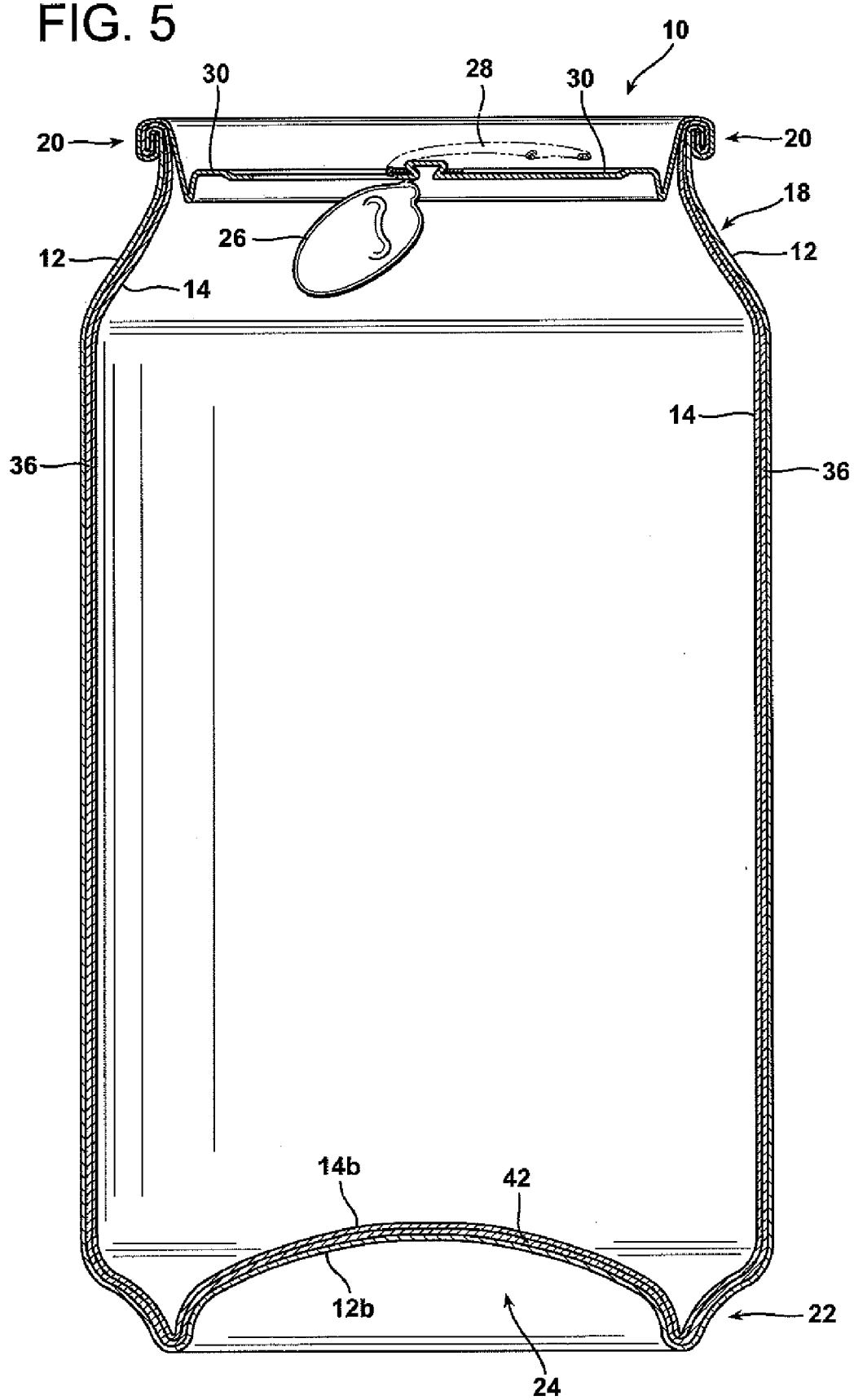

FIG. 5 is a cross-sectional view of the container 10 of the present invention, wherein a continuous, uninterrupted layer of thermally non-conductive material 36 forms the thermal break between the outer wall 12 and the inner wall 14, and between the outer bottom wall 12b and the inner bottom wall 14b, of the container 10. The layer 36 could be formed from any suitable, thermally non-conductive material, such as plastic, foam, etc., and provides added structural rigidity for the container 10. The layer 36 could be formed on the outer surfaces of the inner wall 14 and the inner bottom wall 14b, or on the inner surfaces of the outer wall 12 and the outer bottom wall 12b, using an suitable process, such as dipping, coating, spraying, etc.

Figure 6A:
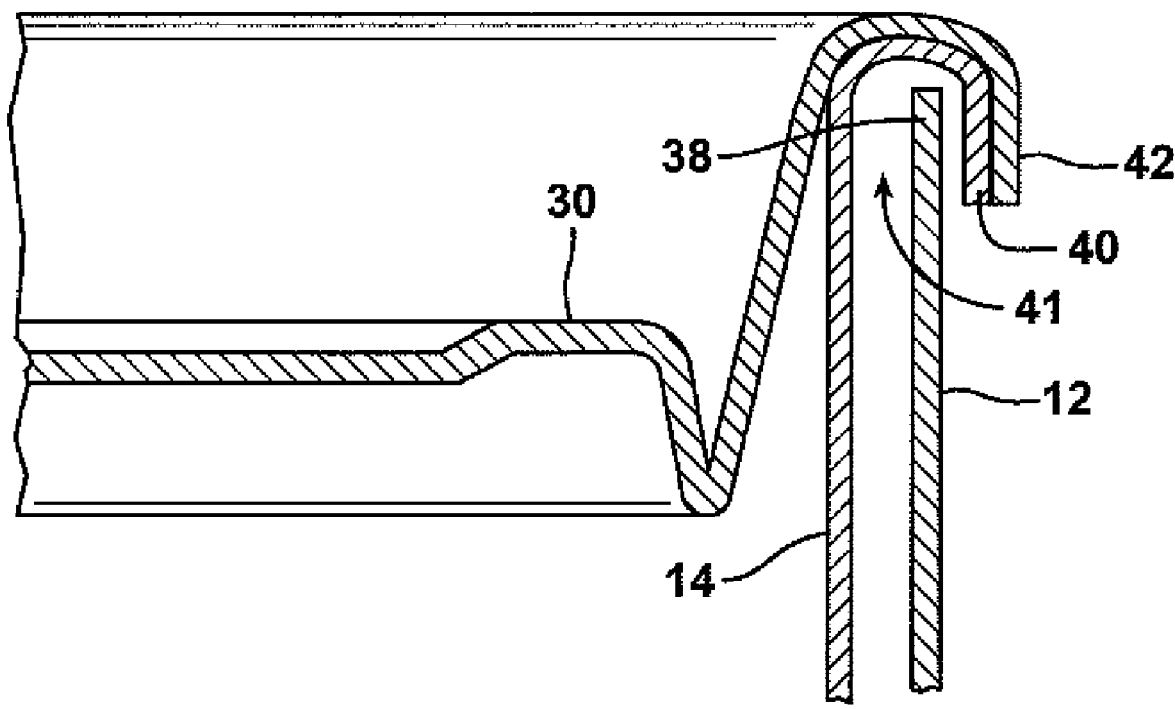
FIGS. 6A-8 are close-up, cross-sectional views showing steps for fabricating the beverage container of the present invention.
Figure 6B:
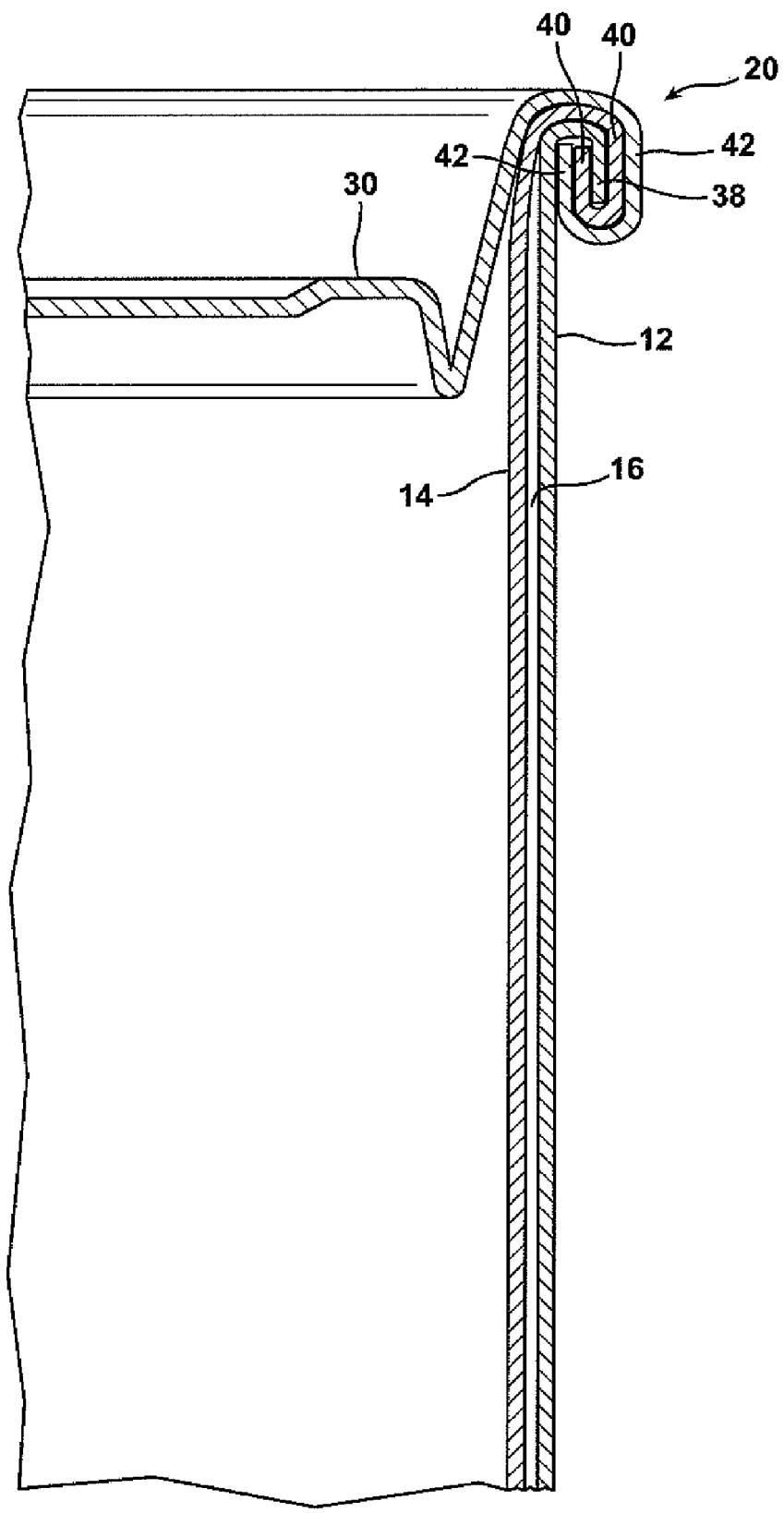

FIGS. 6A-8 are close-up, cross-sectional views showing fabrication of the container of the present invention. One way of fabricating the container is shown in FIGS. 6A-6B. First, the inner wall 14, the outer wall 12, and the top 30 are formed using conventional fabrication processes for forming components of aluminum cans. Then, as shown in FIG. 6A, the inner wall 14 is positioned within the outer wall 12, and a flange 40 created on the inner wall 14 extends over the upper end 38 of the outer wall 12 and serves to support and locate the inner wall 14 with respect to the outer wall 12 and the inner bottom wall 14b with respect to the outer bottom wall 12b, so that a thermal break extending along the sides and bottom of the container is provided. Also, the top 30 is positioned on the flange 40, such that a flange 42 of the top 30 is nested on top of the flange 40 of the inner wall 14. Then, as shown in FIG. 6B, the flanges 40, 42 and end 38 are crimped inwardly or seamed to form the upper rim 20. It is noted that other methods of attaching the top 30 and the inner and outer walls 12, 14 as may be known in the art are within the scope of the present invention. It is noted that if the strips of the present invention are used, or if the thermal break will be filled with material, the strips of material could be positioned between the outer surface of the inner wall 14 and inner surface of the outer wall 12, or formed on either the outer surface of the inner wall 14 or the inner surface of the outer wall 12 (e.g., by coating, spraying, adhering, or otherwise applying) prior to formation of the inner and outer walls, or after formation of the walls prior to positioning the inner wall within the outer wall.

Figure 7A:
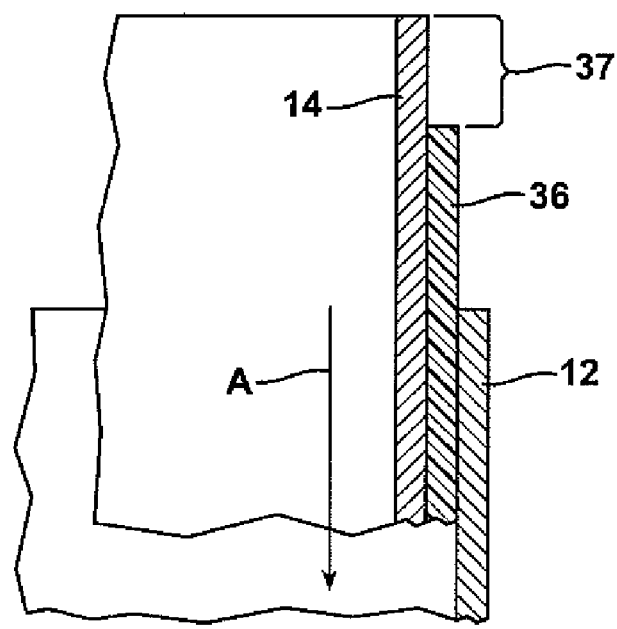
Figure 7B:
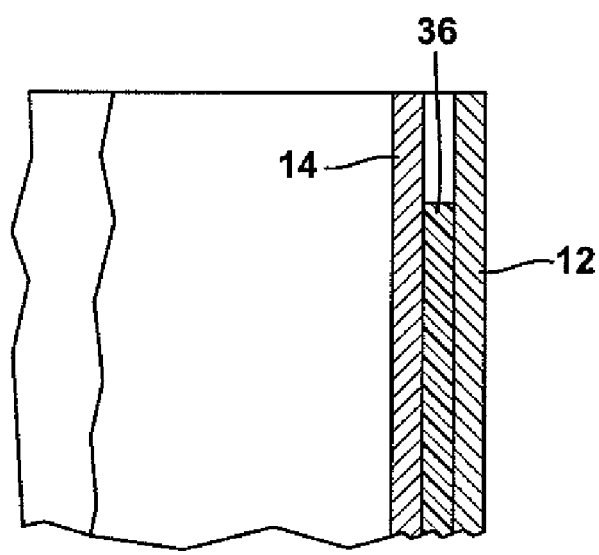
Figure 7C:
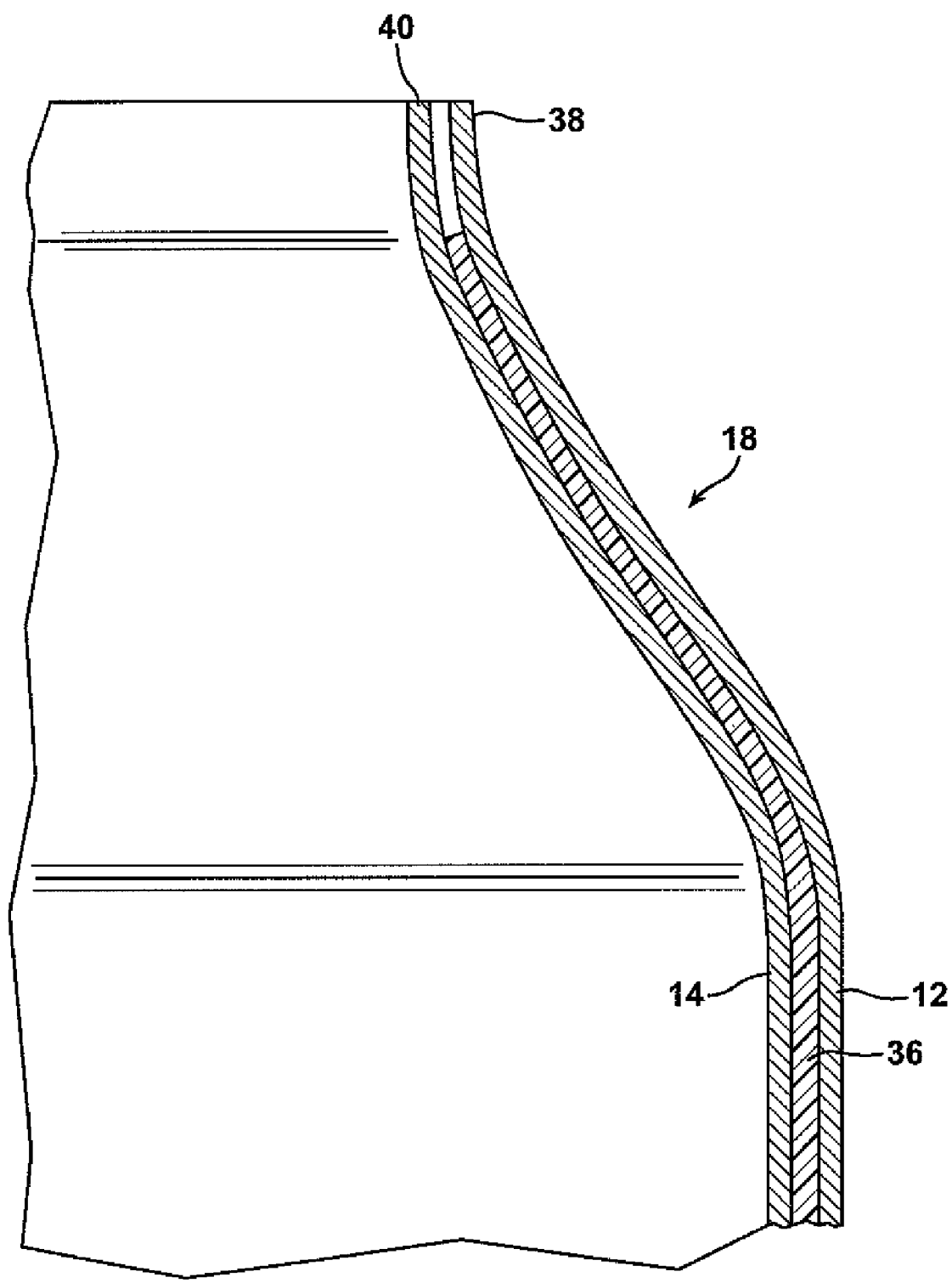
Figure 7D:
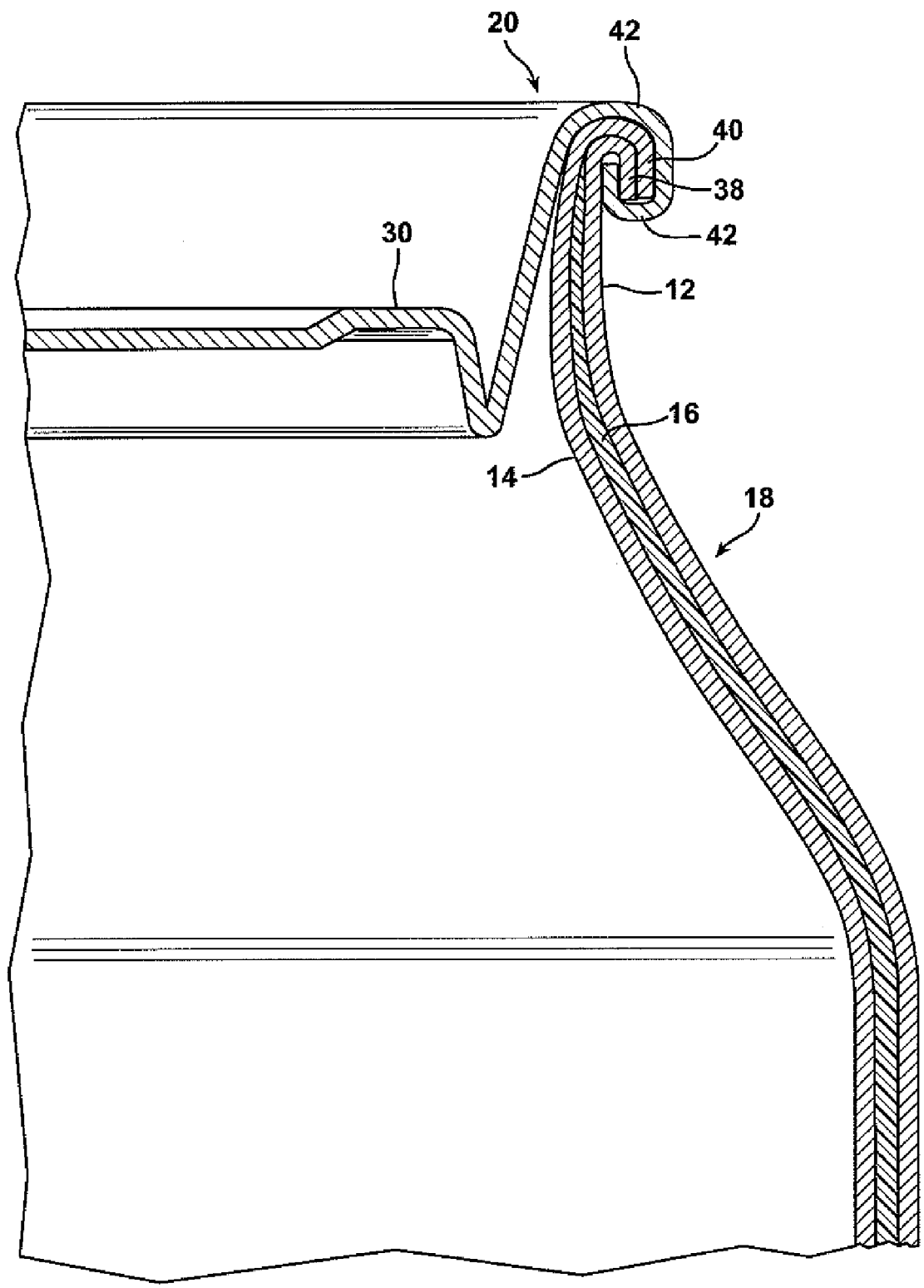

Another way of fabricating the beverage container of the present invention is shown in FIGS. 7A-7D. First, as shown in FIG. 7A, the layer 36 could be formed on the outer surface of the inner wall 14 (e.g., by coating, dipping, spraying, etc.). Optionally, a gap 37 could be provided to facilitate joining (e.g., crimping or seaming) of the inner wall 14, the outer wall 12, and the top 30. Of course, the layer 36 could extend entirely along the inner wall 14 with no gap. Also, the layer 36 could be formed on the inner surface of the outer wall 12, if desired. Once the layer 36 is formed, the inner wall 14 is inserted into position within the outer wall 12, in the general direction indicated by arrow A, such that the inner wall 14 rests within the outer wall 12, as shown in FIG. 7B. In such circumstances, the layer 36 serves to support and position the inner wall 14 with respect to the outer wall 12. Then, as shown in FIG. 7C, the taper 18 is formed by bending both the inner wall 12 and the outer wall 14, using conventional techniques utilized to form the taper of existing beverage containers. Finally, as shown in FIG. 7D, the top 7D is positioned on the inner wall 14 and the outer wall 12, and the flanges 40, 42 and the end 38 are joined together (e.g., crimped, seamed, etc.) to form the complete container. As can be seen, the layer 36 extends up to the top 30.

Figure 8:
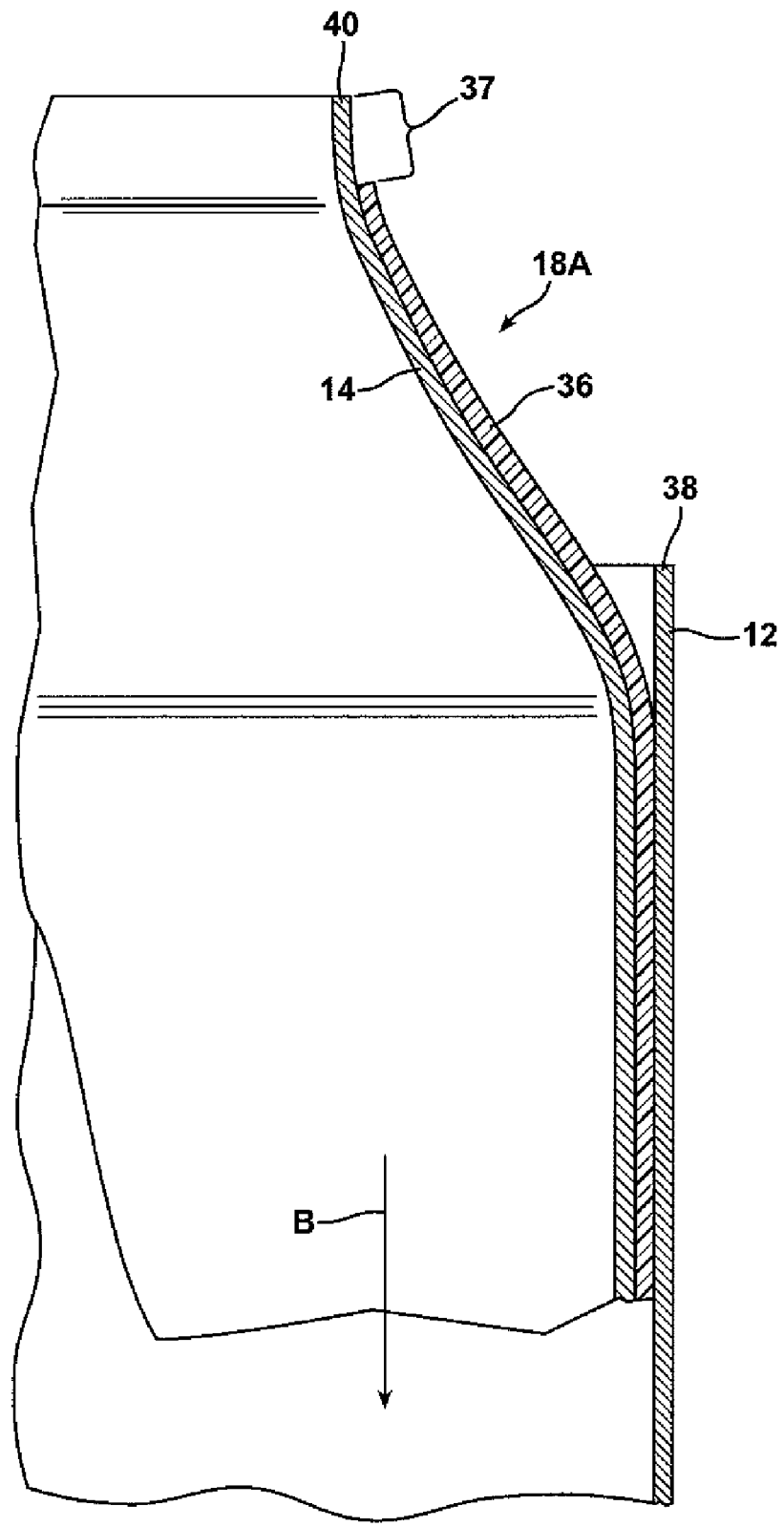

Yet another way of fabricating the beverage container of the present invention is shown in FIG. 8. First, a taper 18A is formed in the inner wall 14, using conventional techniques. Then, the layer 36 is formed on the outer surface of the inner wall 14 (e.g., by dipping, coating, spraying, etc.), and the inner wall 14 is inserted into position within the outer wall 12. As mentioned above, the layer 36 could also be formed on the inner surface of the outer wall 12. Once the inner wall 14 is in position within the outer wall 12, a taper could then be formed in the outer wall 12 to match the taper 18a of the inner wall 14, so that both walls 12, 14 are tapered (as shown in FIG. 7C). Then, as shown in FIG. 7D, the top 30 and walls 12, 14 could be joined, to form the complete container.

Figure 9:
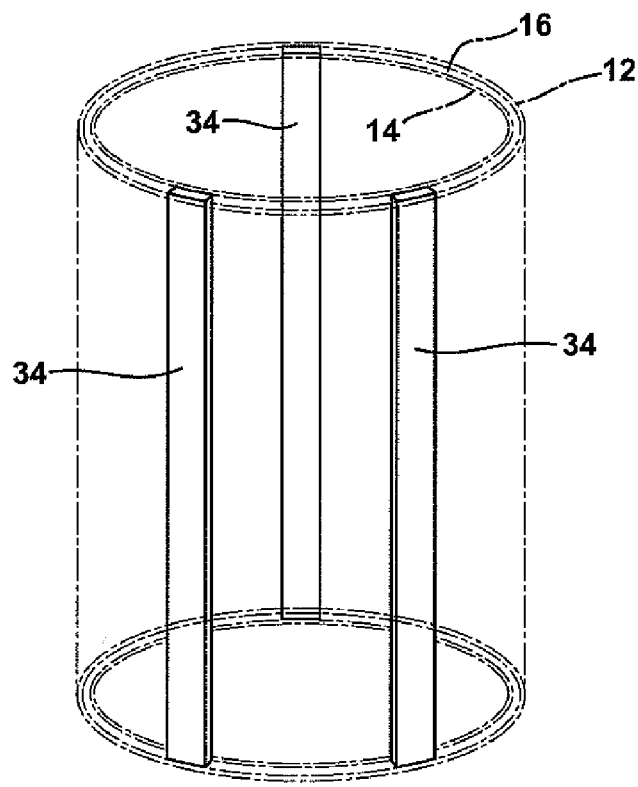
FIGS. 9-10 are partial perspective views showing various configurations of the spacers of the beverage container of the present invention.
Figure 10:
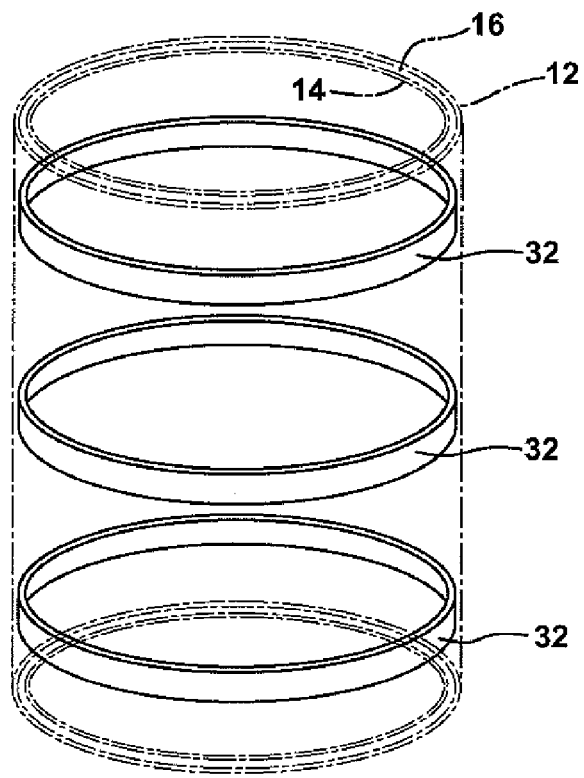

It is noted that any desired number of strips, in any desired spatial arrangement, could form part of the thermal break 16 of the container 10. For example, as shown in FIG. 9, three vertical strips 34 could be included in the thermal break 16 between the inner surface of the outer wall 12 and the outer surface of the inner wall 14. Also, as shown in FIG. 10, three annular strips 32 could be included in the thermal break 16 between the inner surface of the outer wall 12 and the outer surface of the inner wall 14.

Having thus described the invention in detail, it is to be understood that the foregoing description is not intended to limit the spirit or scope thereof What is desired to be protected is set forth in the following claims.

What is claimed is:

1. A beverage container, comprising:
    a top having a finger lever and a tab, wherein the finger lever at least partially separates the tab from the top;
    an outer wall having an outer bottom wall;
    an inner wall positioned within the outer wall, the inner wall having an inner bottom wall positioned above the outer bottom wall; and a thermal break formed between the inner wall and the outer wall and between the inner bottom wall and the outer bottom wall and extending to the top, the outer wall, the inner wall, and the top being joined together, the inner wall and top containing a beverage, and the inner and outer walls comprising aluminum wherein ends of the top, the inner wall, and the outer wall are crimped together to join the inner wall, outer wall, and the top together.

2. The beverage container of claim 1, wherein the thermal break further includes a strip of material positioned between the inner wall and the outer wall.

3. The beverage container of claim 2, wherein the strip of material is annular in shape.

4. The beverage container of claim 2, wherein the strip of material comprises foam.

5. The beverage container of claim 2, wherein the strip of material comprises plastic.

6. The beverage container of claim 5, wherein the strip of material forms an aluminum/plastic/aluminum construction.

7. The beverage container of claim 2, wherein the strip of material comprises a plurality of strips.

8. The beverage container of claim 1, wherein the thermal break includes air trapped between the inner wall and the outer wall.

9. A beverage container, comprising:

a top having a finger lever and a tab, wherein the finger lever at least partially separates the tab from the top;

a continuous aluminum outer wall having an outer bottom wall;

a continuous aluminum inner wall positioned within the outer wall and joined to the outer wall at upper edges of the inner and outer walls, the inner wall having an inner bottom wall positioned above the outer bottom wall, the aluminum inner wall attached to the top to contain a beverage; and a thermal break formed between the inner wall and the outer wall, the thermal break extending uninterrupted between the inner bottom wall and the outer bottom wall wherein ends of the top, the inner wall, and the outer wall are crimped together to form an upper rim of the container.

10. The beverage container of claim 9, wherein the thermal break further includes a strip of material positioned between the inner wall and the outer wall.

11. The beverage container of claim 10, wherein the strip of material is annular in shape.

12. The beverage container of claim 10, wherein the strip of material comprises foam.

13. The beverage container of claim 10, wherein the strip of material comprises plastic.

14. The beverage container of claim 9, wherein the thermal break further comprises air trapped between the inner wall and the outer wall.

* * * * *